US012770521B2

(12) United States Patent
Katz

(10) Patent No.: US 12,770,521 B2
(45) Date of Patent: Oct. 20, 2026

(54) MOBILE GROUND-MARKING SAFETY INDICIA FROM AIRCRAFT AND METHOD

(71) Applicant: The Boeing Company, Arlington, VA (US)

(72) Inventor: Jeremy Benjamin Katz, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 231 days.

(21) Appl. No.: 18/465,458

(22) Filed: Sep. 12, 2023

(65) Prior Publication Data

US 2025/0087102 A1 Mar. 13, 2025

(51) Int. Cl.

*G08G 5/54* (2025.01)
*B64D 47/02* (2006.01)
*G08G 5/74* (2025.01)

(52) U.S. Cl.

CPC ............... *G08G 5/54* (2025.01); *B64D 47/02* (2013.01); *G08G 5/74* (2025.01); *B64D 2203/00* (2013.01)

(58) Field of Classification Search

CPC . G08G 5/54; G08G 5/74; B64D 47/02; B64D 2203/00; B64D 45/00
USPC .......................................................... 701/120
See application file for complete search history.

(56) References Cited

U.S. PATENT DOCUMENTS 5,825,305 A * 10/1998 Biferno ................... B64F 1/002 340/932.2
7,002,488 B2 * 2/2006 Kohlmeier-Beckmann ................. B64D 47/02 342/63
8,289,191 B2 * 10/2012 Larcher .................. B64D 47/02 356/615
9,092,976 B2 * 7/2015 Khatwa .................... G08G 5/21
9,567,102 B1 * 2/2017 Ross ....................... B64D 45/00
9,944,405 B2 * 4/2018 Mouton ................ B64C 27/006
10,501,207 B2 * 12/2019 Carradori ............... B64D 47/02
10,710,743 B1 * 7/2020 Shamasundar ........ B64D 45/08
2003/0058653 A1 * 3/2003 Konicke ................ B64D 47/04 362/543
2003/0107499 A1 * 6/2003 Lepere ................... G01C 5/005 340/945
2009/0182506 A1 * 7/2009 Yun .......................... G08G 5/21 701/301
2010/0302072 A1 12/2010 Larcher
2013/0129357 A1 * 5/2013 Belnap .................... B64C 19/00 398/106
2018/0009547 A1 * 1/2018 Brewer .................. B64D 33/04
2018/0050821 A1 * 2/2018 Schoen .................. B64D 47/06
2021/0114746 A1 * 4/2021 Schallenberg ......... B60Q 1/247
2025/0076040 A1 * 3/2025 Sandall .................. G01C 5/005

OTHER PUBLICATIONS

EP Search Report mailed Feb. 14, 2025 in re EP Application No. 24199119.9.

* cited by examiner

*Primary Examiner* — Krishnan Ramesh
(74) *Attorney, Agent, or Firm* — COATS & BENNETT, PLLC

(57) ABSTRACT

Apparatuses, systems, and methods are disclosed for establishing visually detectable ground markings, including in daylight, and designating visually detectable unsafe ground traffic areas from safe ground traffic areas proximate to and beneath an aircraft by providing visually detectable ground images formed from high intensity light energy sources located on an aircraft.

20 Claims, 10 Drawing Sheets

MOBILE GROUND-MARKING SAFETY INDICIA FROM AIRCRAFT AND METHOD

TECHNOLOGICAL FIELD

The present disclosure relates, generally, to the field of area safety markings. More specifically, the present disclosure relates to the field of indicating safe traffic zones in an area.

BACKGROUND

Ground markings for aircraft, for example, near a terminal gate have included permanent markings denoting desired positioning of an aircraft that arrives at a terminal gate. Such ground markings are typically painted markings that are visible by daylight, and can be further visible at night by ground crew and aircraft crew if the markings are properly illuminated.

Such ground markings can serve the purpose of indicating to ground crew, including service personnel, areas that are safe to transit and/or warn such ground crew and/or service personnel that damage to aircraft can occur if, for example, a ground vehicle transits within an unsafe area denoted by the ground marking.

The ability of the ground markings to provide safety and preclude impact from ground vehicles is dependent upon the visibility of the ground markings and the compliance of ground crew/service personnel in observing the ground markings. Failure of ground vehicles and ground crew to reliably perceive and observe ground markings can result in damage to aircraft, aircraft structures, aircraft sub-assemblies, (and ground vehicles charged with servicing an aircraft), including damage to aircraft structures that are positioned relatively close to the ground when the aircraft is on the ground.

Unless explicitly identified as such, no statement herein is admitted as prior art merely by its inclusion in the Technological Field and/or Background sections.

SUMMARY

Present aspects are directed to an apparatus for designating unsafe ground areas proximate to an aircraft, said apparatus, with the apparatus including comprising a light energy array comprising a light energy source, with the light energy array configured to direct light energy from the light energy array onto a ground target region to form a ground target region visible image within a ground target region visible image perimeter, and with the ground target region visible image perimeter image located a selected distance from the light energy array. The apparatus further includes a housing configured to retain the light energy source in a selected position on an aircraft structure of an aircraft, and a power source in communication with the light energy source, and wherein the ground target region visible image perimeter is visible to the human eye in daylight and the ground target region visible image perimeter is further visible to the human eye at nighttime.

In another aspect, the ground target region visible image perimeter identifies a no-go ground traffic zone within the ground target region visible image perimeter.

In another aspect, the power source is positioned aboard the aircraft.

In a further aspect, the light energy array is positioned on the aircraft structure, with said light energy array positioned a distance from the ground target region ranging from about 5 feet to about 20 feet.

In another aspect, the light energy source is a high intensity light energy source.

In another aspect, the light energy source comprises a laser.

In another aspect, the light energy source comprises a focused LED array.

In another aspect, the ground target region visible image perimeter is configured to give the appearance of movement on the ground based on a changing appearance of ground the target region visible image.

In another aspect, the ground target region visible image perimeter is configured to move relative to the ground based on a changing location of the aircraft.

In another aspect, the ground target region visible image perimeter is a continuous ground target region visible image perimeter.

In a further aspect, the ground target region visible image perimeter is a discontinuous ground target region perimeter visible image.

In another aspect, the ground target region visible image perimeter is configured to change color from at least a first color to a second color.

In another aspect, the ground target region visible image perimeter includes a selected design.

In another aspect, the design is configured to give the appearance of movement.

In another aspect, the apparatus further includes a sequencer that can be at least one of a signal sequencer and a light sequencer, the sequencer in communication with the light energy array.

In another aspect, the light energy source is configured to deliver light energy from a light energy source at an intensity measured at the ground ranging from about 20,000 lux to about 30,000 lux at a distance between the ground and the light energy source ranging from about 5 feet to about 20 feet.

Another present aspect is directed to an aircraft structure of an aircraft including an apparatus for designating unsafe ground areas proximate to the aircraft, with the apparatus including comprising a light energy array comprising a light energy source, with the light energy array configured to direct light energy from the light energy array onto a ground target region to form a ground target region visible image perimeter, and with the ground target region visible image perimeter image located a selected distance from the light energy array. The apparatus further includes a housing configured to retain the light energy source in a selected position on an aircraft structure of an aircraft, and a power source in communication with the light energy source, and wherein the ground target region visible image perimeter is visible to the human eye in daylight and the ground target region visible image perimeter is further visible to the human eye at nighttime.

A further present aspect is directed to an aircraft comprising an aircraft structure that includes an apparatus for designating unsafe ground areas proximate to the aircraft, with the apparatus including comprising a light energy array comprising a light energy source, with the light energy array configured to direct light energy from the light energy array onto a ground target region to form a ground target region visible image perimeter, and with the ground target region visible image perimeter image located a selected distance from the light energy array. The apparatus further includes a housing configured to retain the light energy source in a selected position on an aircraft structure of an aircraft, and a power source in communication with the light energy source, and wherein the ground target region visible image perimeter is visible to the human eye in daylight and the ground target region visible image perimeter is further visible to the human eye at nighttime.

A further present aspect is directed to a system for designating unsafe ground areas from safe ground areas proximate to an aircraft, with the system including a light energy array comprising a light energy source, with the light energy array configured to direct light energy from the light energy source onto a ground target region to form a ground target region visible image having a ground target region visible image perimeter, with the ground target region visible image perimeter located a selected distance from the light energy array. The system further includes a housing configured to retain the light energy array in a selected position on an aircraft structure of an aircraft, a power source in communication with the light energy source, a controller in communication with at least one of the power source and the light energy source, and a sequencer in communication with at least one of the controller, the power source and the light energy source, wherein the ground target region visible image perimeter is visible to the human eye in daylight and the ground target region visible image perimeter is further visible to the human eye at nighttime.

In another aspect, the system further includes a sensor, with the sensor in communication with at least one of the power source and the controller, with the sensor configured to confirm an aircraft location on the ground.

In another aspect, the ground target region visible image perimeter identifies a no-go ground traffic zone within a ground target region visible image perimeter.

In another aspect, the ground target region visible image perimeter comprises a ground target region visible image.

In another aspect, the ground target region visible image perimeter comprises a continuous ground target region visible image perimeter that remains unchanged during illumination.

In another aspect, the ground target region visible image comprises a discontinuous ground target region visible image perimeter that changes appearance during illumination.

In another aspect, the ground target region visible image perimeter is configured to change color from at least a first color to a second color.

Another present aspect is directed to an aircraft structure comprising a system for designating unsafe ground areas from safe ground areas proximate to an aircraft, with the system including a light energy array comprising a light energy source, with the light energy array configured to direct light energy from the light energy source onto a ground target region to form a ground target region visible image within a ground target region visible image perimeter, with the ground target region visible image located a selected distance from the light energy array. The system further includes a housing configured to retain the light energy array in a selected position on an aircraft structure of an aircraft, a power source in communication with the light energy source, a controller in communication with at least one of the power source and the light energy source, and a sequencer in communication with at least one of the controller, the power source and the light energy source, wherein the ground target region visible image is visible to the human eye in daylight and the ground target region visible image is further visible to the human eye at nighttime.

Another present aspect is directed to an aircraft comprising a system for designating unsafe ground areas from safe ground areas proximate to an aircraft, with the system including a light energy array comprising a light energy source, with the light energy array configured to direct light energy from the light energy source onto a ground target region to form a ground target region visible image, with the ground target region visible image located a selected distance from the light energy array. The system further includes a housing configured to retain the light energy array in a selected position on an aircraft structure of an aircraft, a power source in communication with the light energy source, a controller in communication with at least one of the power source and the light energy source, and a sequencer in communication with at least one of the controller, the power source and the light energy source, wherein the ground target region visible image is visible to the human eye in daylight and the ground target region visible image is further visible to the human eye at nighttime.

Present aspects are further directed to a method for visually designating unsafe ground areas proximate to an aircraft, with the method including directing light energy from a laser onto a ground target region, with the said laser positioned in an aircraft structure of an aircraft, said ground target region located beneath the aircraft structure. The method further includes forming a ground target region visible image at the ground target region.

In another aspect, the method includes indicating a no-go-ground traffic zone within the ground target region visible image perimeter at the ground target region.

In another aspect, the method further includes altering the appearance of the ground target region visible image.

In another aspect, the method further includes delivering light energy from a light energy source at an intensity measured at the ground ranging from about 20,000 lux to about 30,000 lux at a distance between the ground and the light energy source ranging from about 5 feet to about 20 feet.

In another aspect, the method further includes determining that the aircraft is in contact with the ground.

In a further method, the method further includes activating the light energy source while the aircraft is on the ground.

In another aspect, the method further includes forming a moving ground target region visible image perimeter when the aircraft is in motion on the ground.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
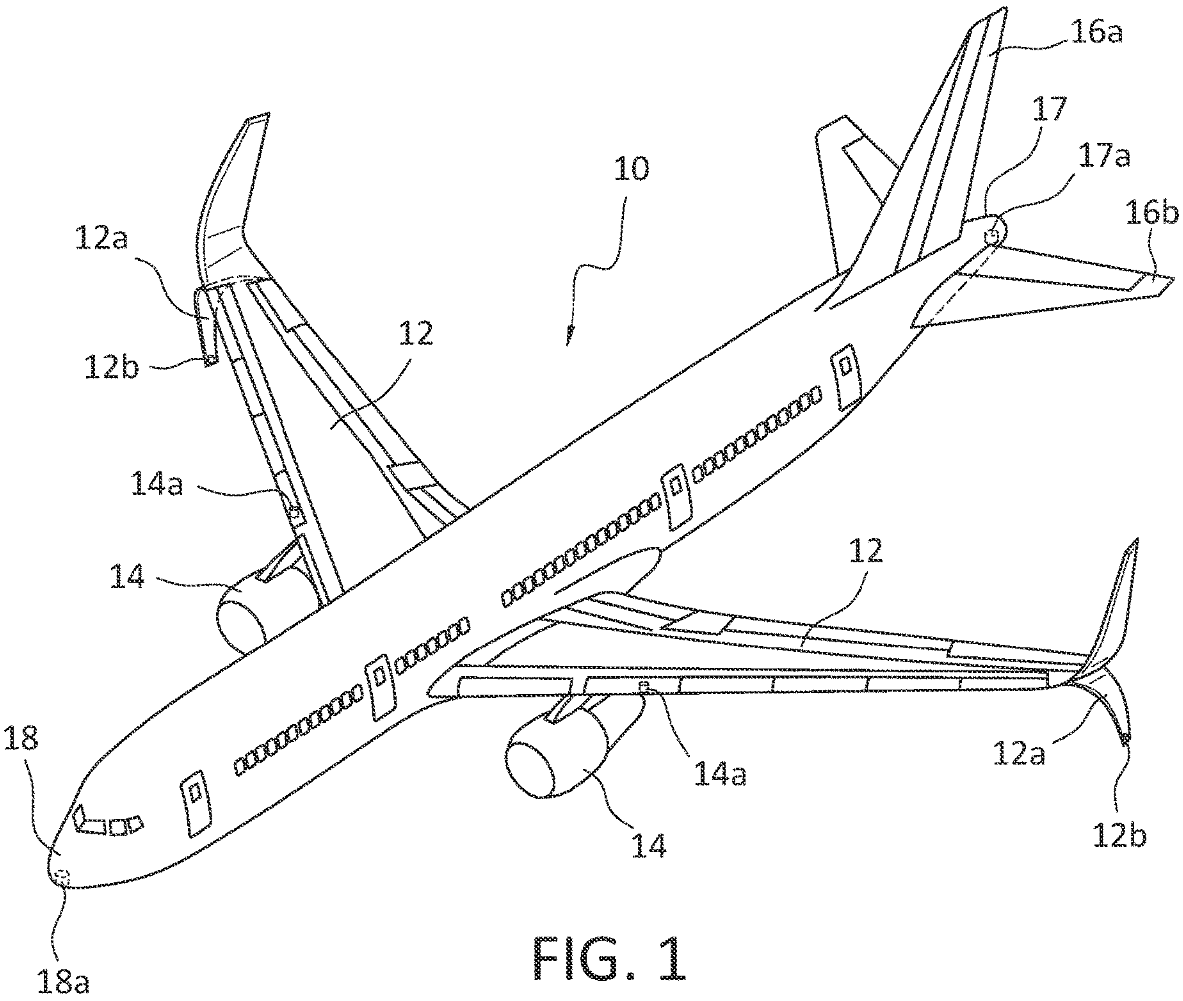
Figure 2:
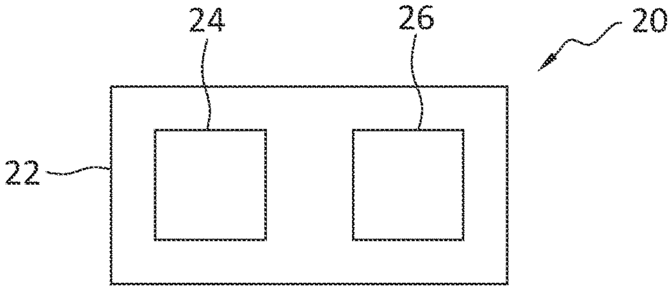
Figure 3:
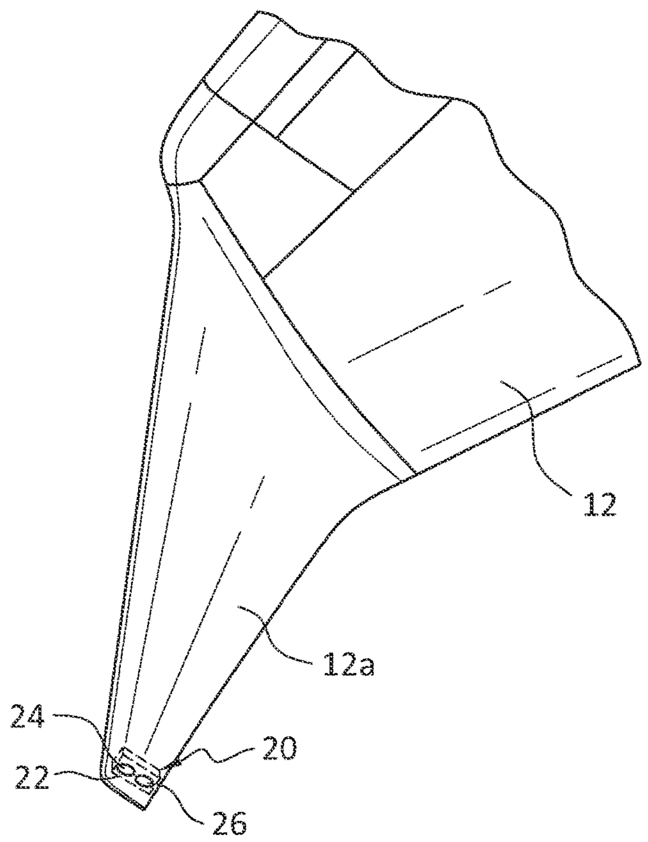
Figure 5:
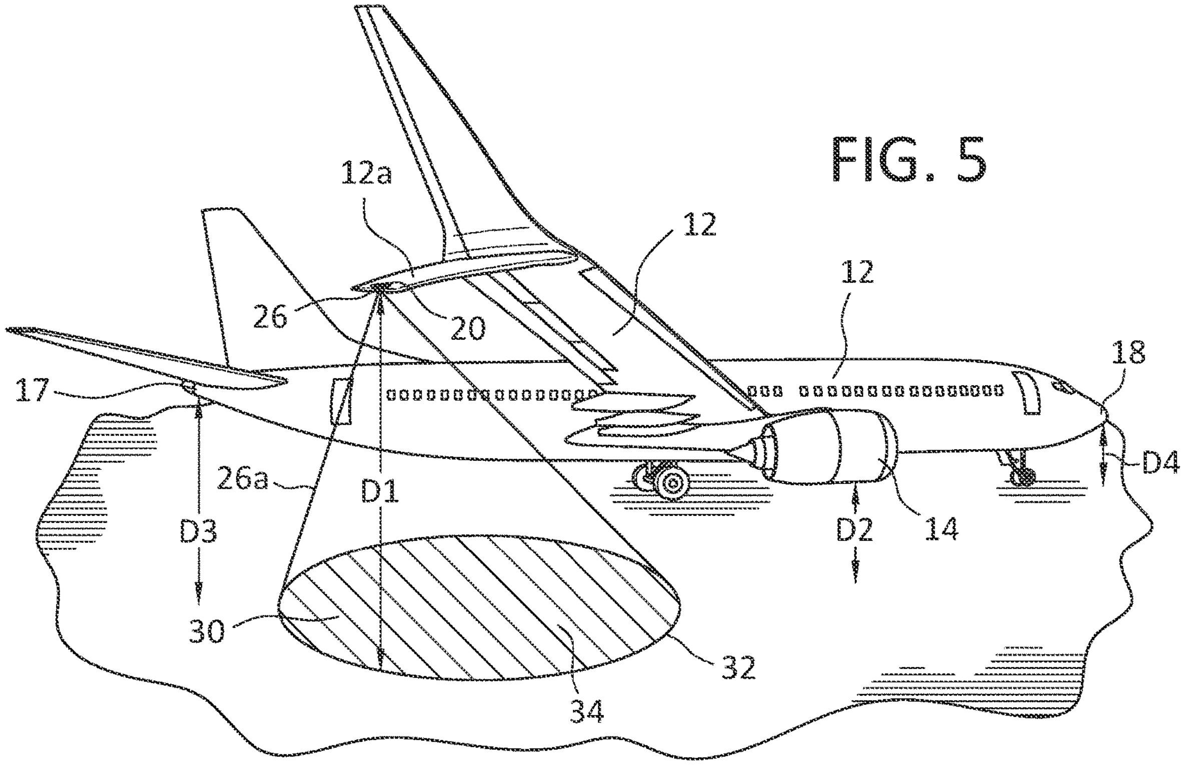
Figure 4A:
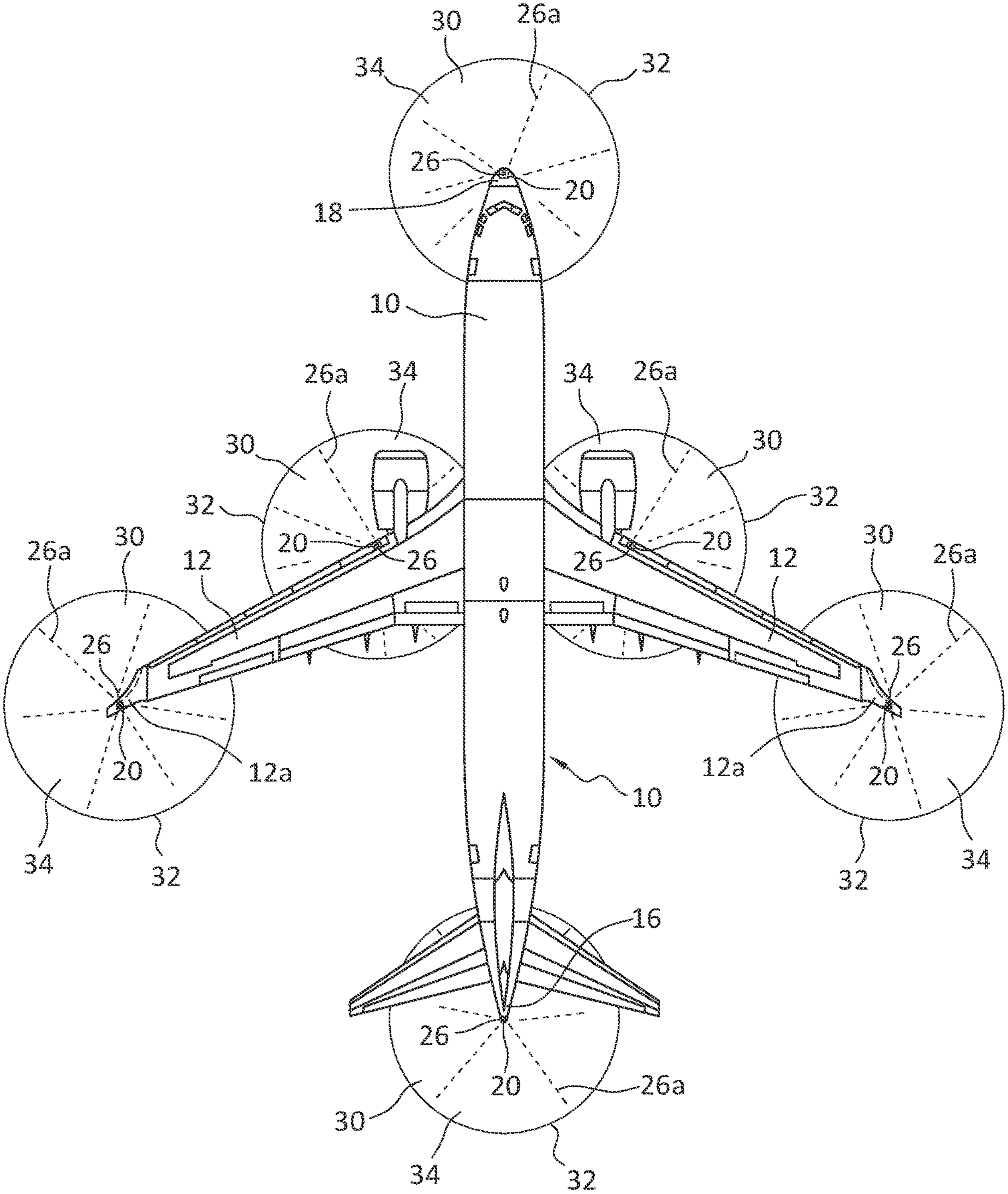
Figure 4B:
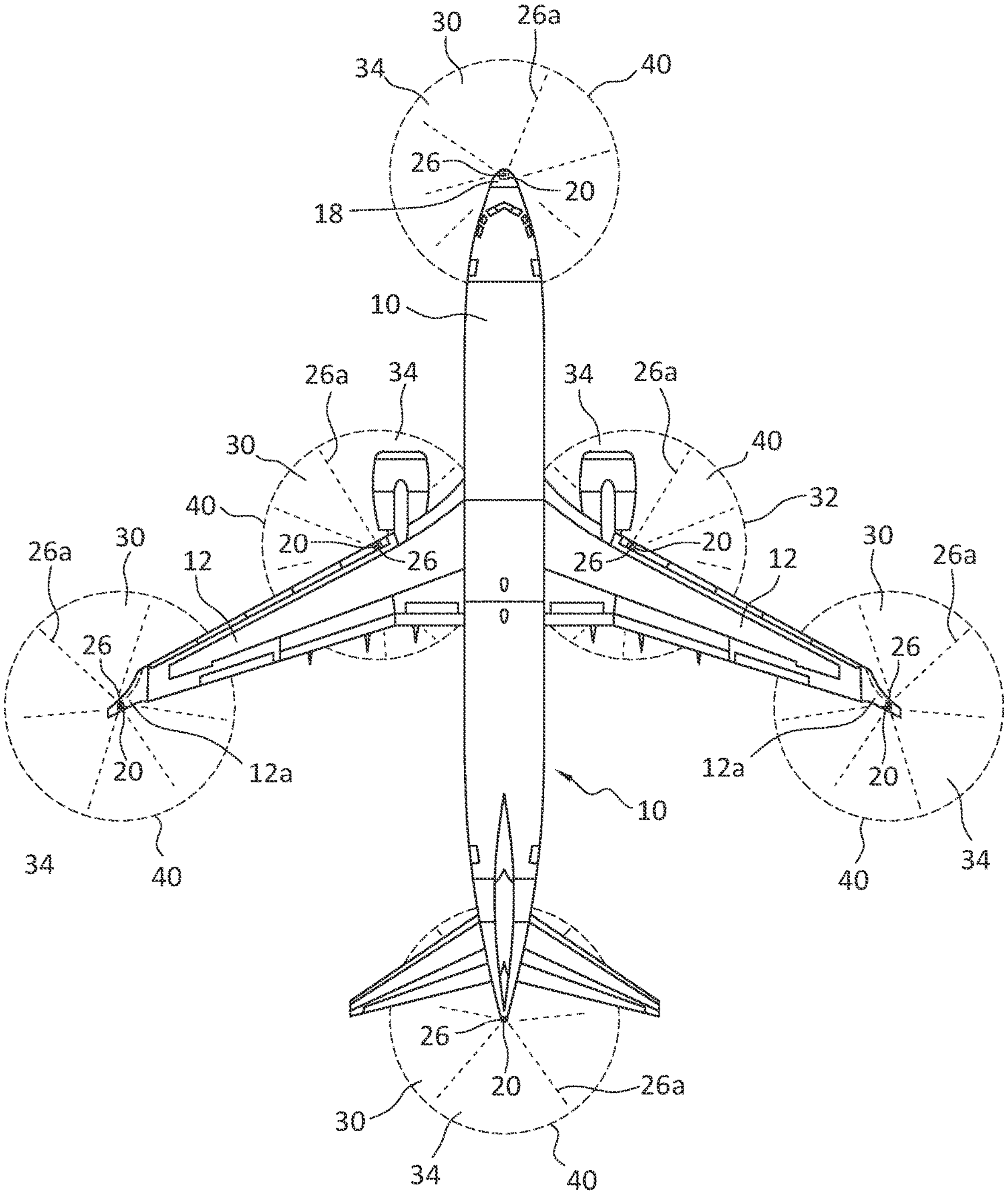
Figure 4C:
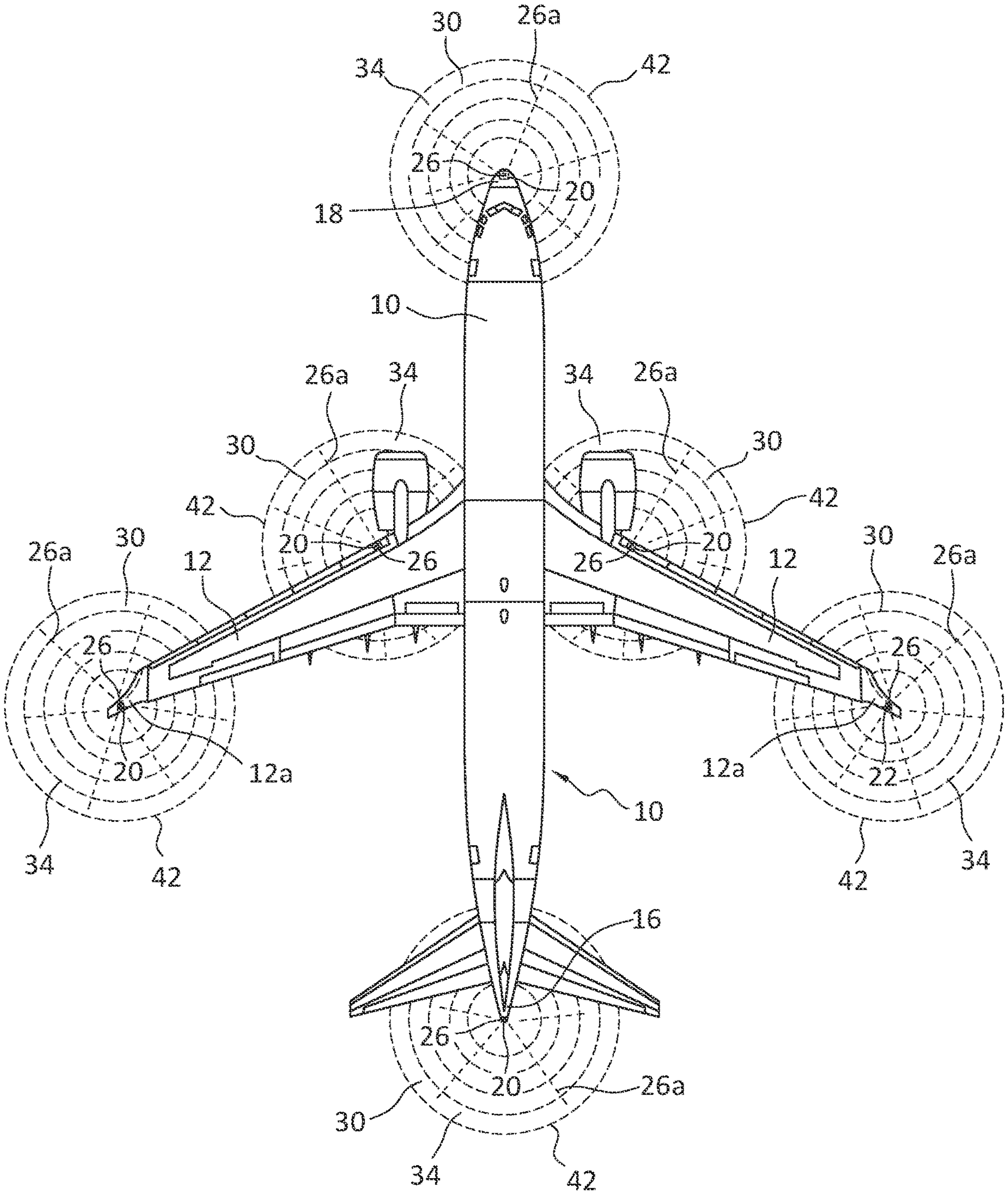
Figure 6:
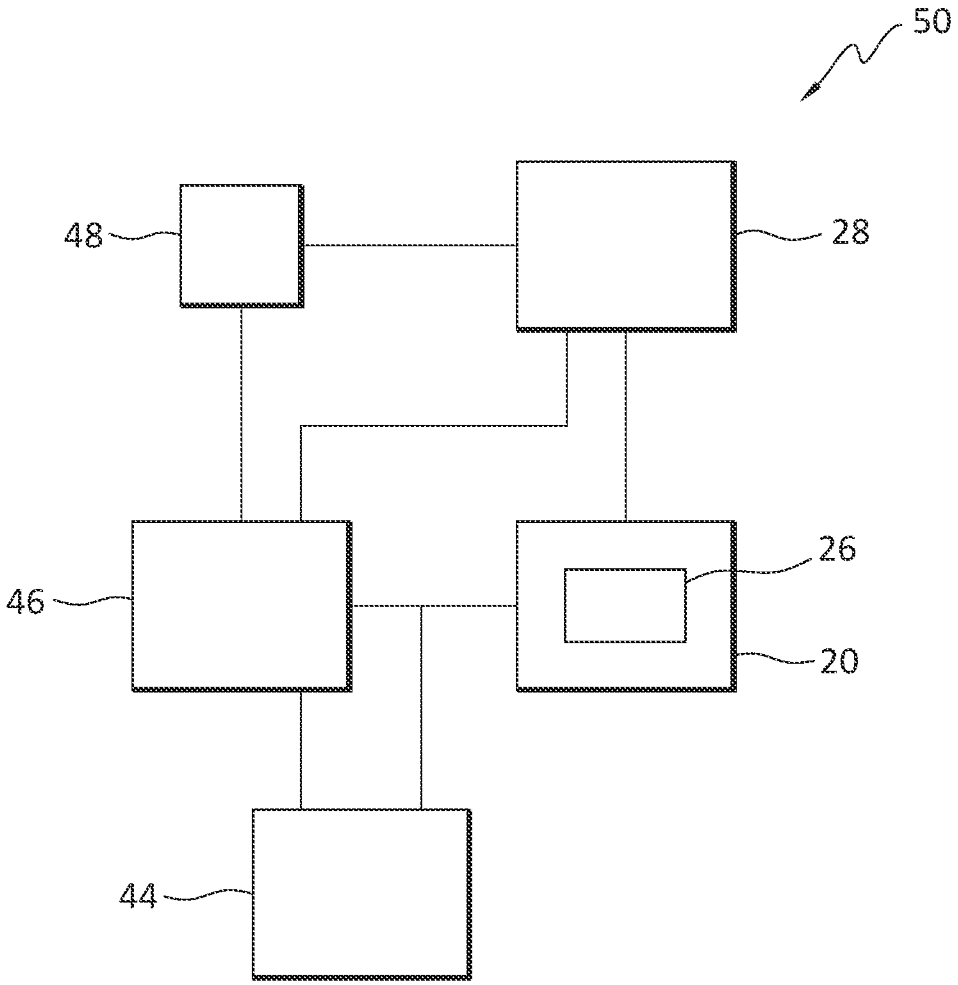
Figure 7:
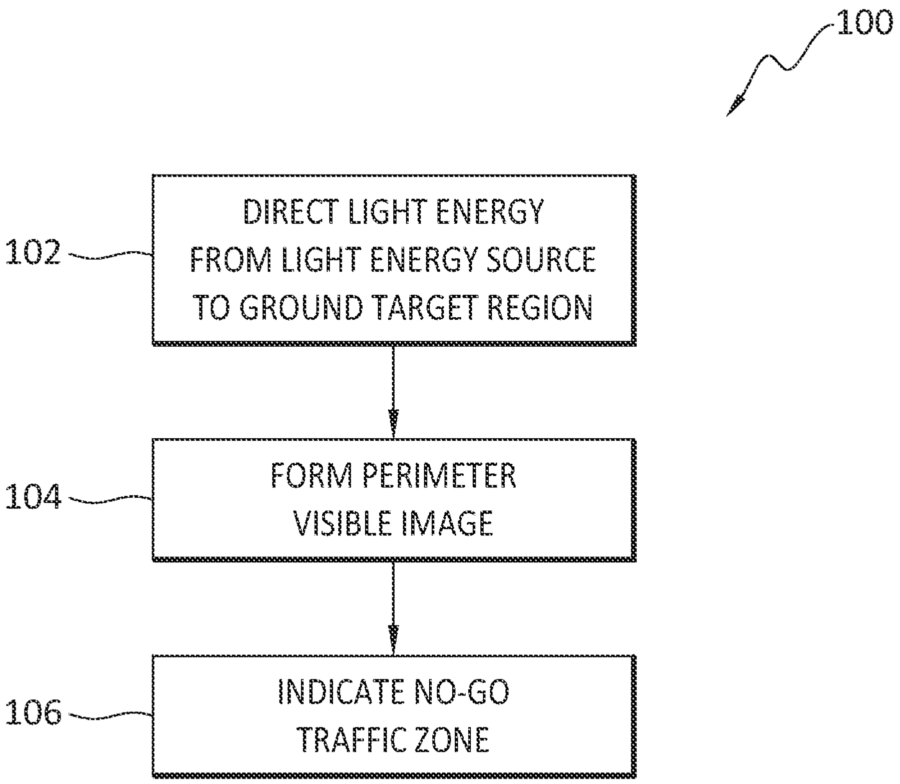
Figure 8:
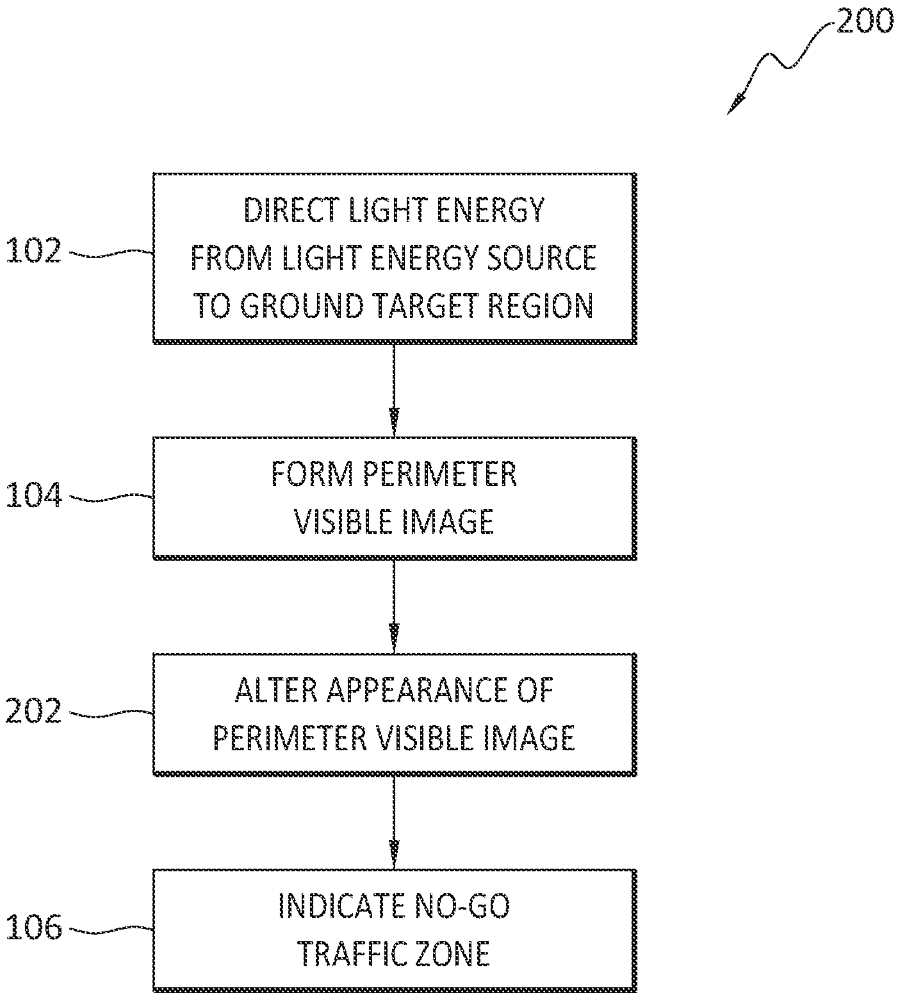
Figure 9:
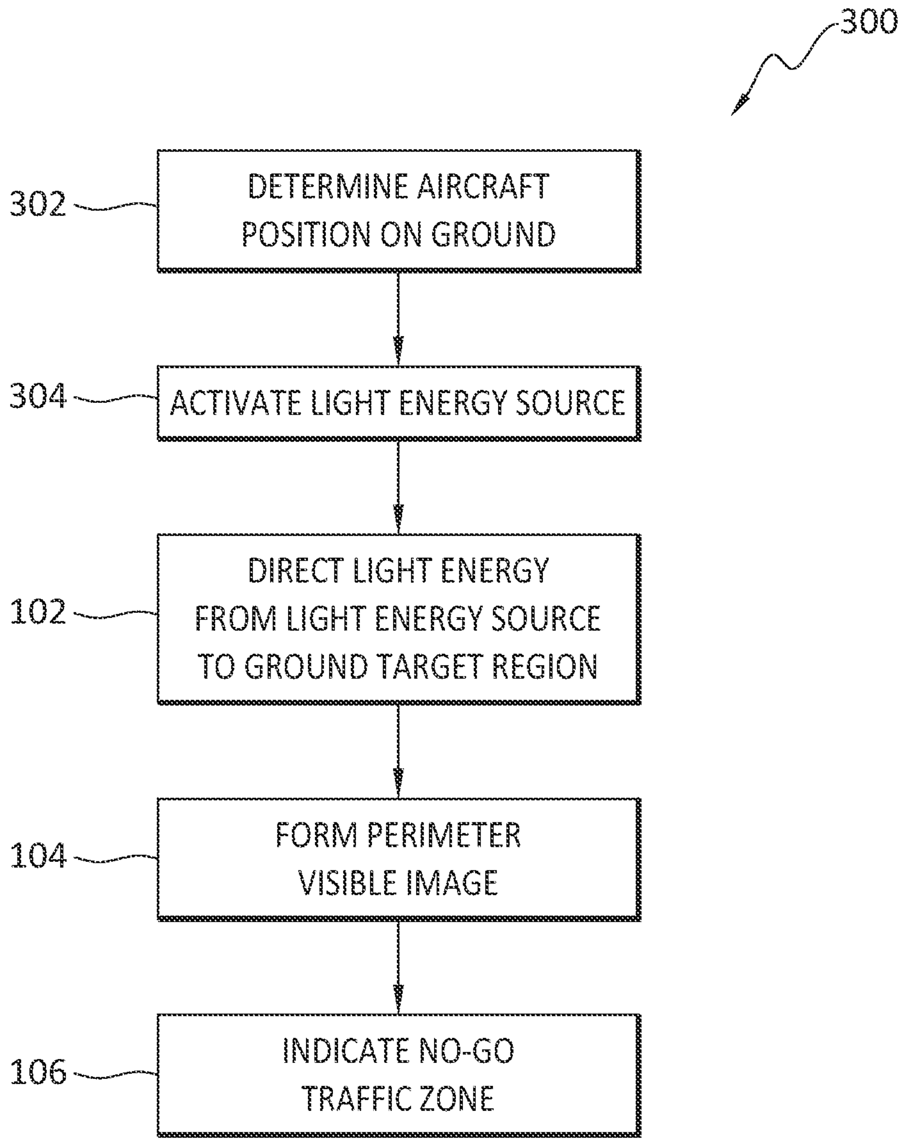

Having thus described variations of the disclosure in general terms, reference will now be made to the accompanying drawings, which are not necessarily drawn to scale, and wherein:

FIG. 1 is a perspective view of an aircraft, according to present aspects;

FIG. 2 is a box diagram illustrating a light energy array, according to present aspect;

FIG. 3 is an upward view from underneath a portion of an aircraft structure in the form of an aircraft wing, according to present aspects;

FIG. 4A is an overhead plan view of an aircraft on the ground comprising light energy arrays illuminating target ground regions, according to present aspects;

FIG. 4B is an overhead plan view of an aircraft on the ground comprising light energy arrays illuminating target ground regions, according to present aspects;

FIG. 4C is an overhead plan view of an aircraft on the ground comprising light energy arrays illuminating target ground regions, according to present aspects;

FIG. 5 is a side view of an aircraft on the ground comprising a light energy array illuminating a target ground image, according to present aspects;

FIG. 6 is a box diagram outlining a system, according to present aspects;

FIG. 7 is a flowchart outlining a method according to present aspects;

FIG. 8 is a flowchart outlining a method according to present aspects;

FIG. 9 is a flowchart outlining a method according to present aspects; and

Figure 10:
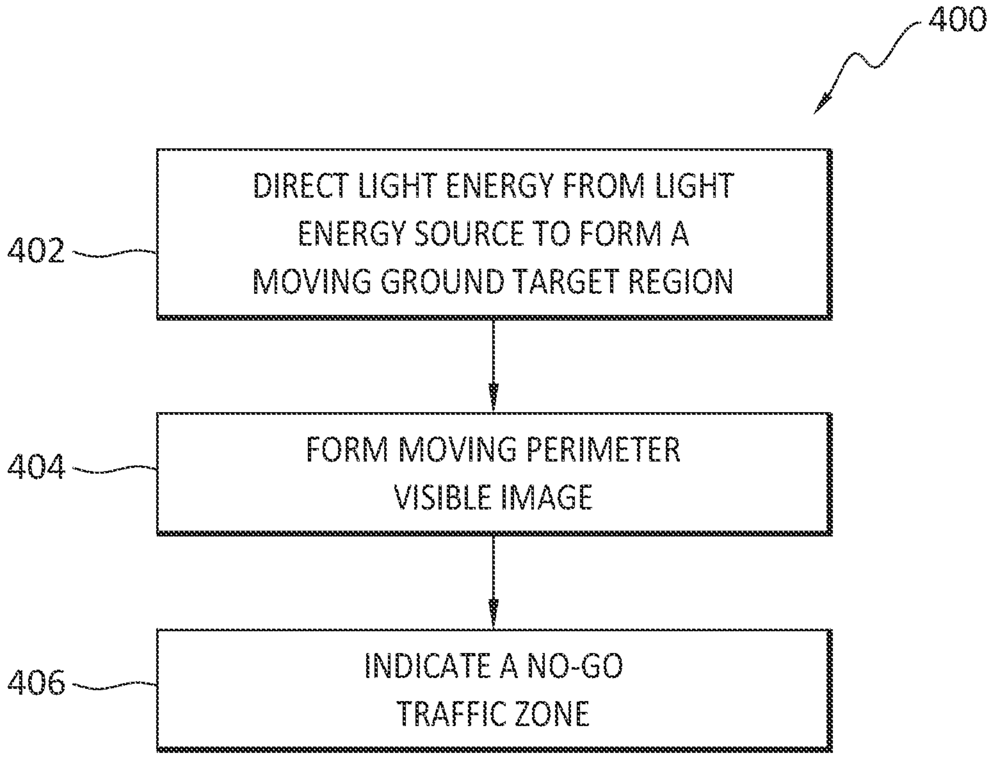

FIG. 10 is a flowchart outlining a method according to present aspects.

DETAILED DESCRIPTION

As explained herein, vehicles that approach aircraft on the ground to service the aircraft can inadvertently collide with aircraft, including striking aircraft structures, aircraft subassemblies, etc. Present aspects are directed to significant safety enhancements that increase safety for ground personnel and that provide a significantly enhanced safety environment that can obviate aircraft and vehicular damage occurring when aircraft are mobile (e.g., at slow speeds on the ground) and/or when aircraft are stationary on the ground. Present aspects are further directed to the selected placement and selected appearance of temporary ground markings (equivalently referred to herein as "indicia") that can be visually perceived by personnel approaching aircraft on the ground, including personnel operating ground vehicles while an aircraft is stationary on a runway, at a gate, etc., as well as when an aircraft is moving while on the ground, including, e.g., while under power, during push-back, during taxiing, etc.

Rather than rely on permanent stationary ground markings at or near a gate that are provided to direct an aircraft to a safe location, and to alert or warn ground personnel about collision risk as ground vehicles approach an aircraft, present aspects are directed to improved mobile and stationary ground markings that can be visually detected by the human eye in daylight and at nighttime, and that are generated by a light source positioned on the aircraft. Further present aspects are directed to light-generated ground markings and safety indicia that can travel with an aircraft, marking safe zones or safe areas proximate to aircraft structures from unsafe zones or unsafe areas proximate to aircraft structures (e.g., demarking unsafe "no-go" ground transit zones or "paths" from safe "go" ground transit zones or "paths", etc., with "no-go" ground transit zones" equivalently referred to herein as "no-go zones", "no-go transit zones", "no-go ground traffic zones", and/or "no-go traffic zones").

The failure of ground personnel, including ground personnel operating ground vehicles to accurately and/or timely perceive a no-go zone within a ground target region near an aircraft can result in collisions, or otherwise result in damage to aircraft structures and ground vehicles, equipment moved by ground vehicles (e.g., portable stairways, tanks, containers, etc.). Such damage to aircraft from ground vehicle collision with aircraft structures can necessitate significant aircraft repair that can take an aircraft out of service for prolonged periods, resulting in costly and time-consuming repairs, and that can, for example, complicate aircraft flight assignment and flight scheduling, for example.

In addition, permanent (e.g., painted, etc.) or temporary (e.g., cones, barrels, etc.) ground markings, or barriers typically used as warnings to ground personnel of non-transit zones may universally apply to different-sized aircraft types or "models" having potentially varying dimensions but that are to occupy the same gate, for example. In addition, confusing ground markings, or a plurality of varying ground markings based on each aircraft type that may be assigned to a common area, gate, space, etc., can further confuse ground personnel, or can be misapplied through, for example, ground personnel error, etc.

A regular light source that may already exist on an aircraft structure or affixed to a gate and that can visually mark a particular ground target region (but only at nighttime), also may encompass too large of a region, or establish a no-go ground transit zone or area that is excessive and/or unnecessarily large, and could inhibit air transportation efficiency, especially when aircraft gate area is at a premium. In addition, even if a conventional lighting system at a gate area were feasible, such systems of regular lighting would be ineffective and otherwise useless to illuminate a ground target area during daylight hours for the purpose of establishing a visually perceptible and visually detectable "no-go ground transit zone" in daytime.

FIG. 1 is an illustration of an aircraft 10 including fuselage 11, wing assemblies 12, engine assemblies 14, vertical stabilizer 16*a*, horizontal stabilizers 16*b*, tail section 17 and nose 18. Wing assemblies 12 further include winglets 12*a* and winglet light housings 12*b*. Nose 18 further includes nose light housing 18*a*, and tail section 17 further includes taillight housing 17*a*. FIG. 1 further shows a light housing 14*a* that can be positioned on engine 14, and that can also be positioned on an aircraft structure proximate to an aircraft engine assembly (e.g., a wing assembly), such that, for example, the "engine" light housing 14*a* can deliver a visually detectable beam of light energy to a ground target region that is located beneath an aircraft engine assembly. Accordingly, while not restricted to a location on the engine assembly 14, light housing 14*a* is equivalently referred to herein as engine assembly light housing 14*a*.

FIG. 2 is a box diagram, according to present aspects, representing a light energy array 20, according to present aspects, that can be incorporated into the locations of any of the light housings shown in FIG. 1, and with light energy array 20 as shown in FIG. 2 including a housing 22 in communication with and otherwise including and incorporating a first light energy source 24 that can be, for example, a conventional light having a conventional light intensity, and a second light energy source 26 that can be a high intensity light energy source that can include, for example, a laser or other high intensity light energy source. According to present aspects, and as explained herein, the high intensity second light energy source 26 differs from the first light energy source 24 in that the second light energy source is configured to deliver a beam of light energy at an intensity that is visible (e.g., visually detectable by a human eye) at a ground target region or area in daytime (e.g., in daylight) as well as nighttime (e.g., low environmental light situations). That is, in contrast to the second light energy source 26, the first light energy source 24, if present, can produce and deliver a light beam to a ground target area that is visually detectable at nighttime only.

FIG. 3 is an enlarged view of a section of aircraft wing 12 showing aircraft winglet 12*a* including light energy array 20 that further includes first light energy source 24 and second light energy source 26. FIGS. 4A, 4B, and 4C are overhead plan views of aircraft 10 positioned on the ground, and that can be of the aircraft type shown, for example in FIG. 1, and that comprise the various light housings collectively referred to as "light energy array 20" that houses first and second light energy sources 24, 26 respectively; although as shown in FIGS. 4A, 4B, 4C focus is paid to second light energy source 26 (referred to equivalently herein as the "high intensity light energy source", with the understanding that light energy array 20 can also comprise the first light energy source 24 that can be a conventional light having a conventional intensity. Each of FIGS. 4A, 4B, 4C further illustrate aircraft 10 in a position on the ground, although aircraft 10 in FIGS. 4A, 4B, 4C can represent an aircraft 10 that is either in a stationary position on the ground, or is moving while on the ground.

As shown in FIG. 4A, aircraft 10 comprises a plurality of light energy arrays 20 located on an aircraft structure, with the light energy arrays 20 positioned, according to one example, on an aircraft structure location that can be on the underside of the aircraft, so long as the light energy array 20 comprises a light energy source 26 (that is equivalently referred to herein as the second light energy source 26) that is a high intensity light energy source that is configured to produce and otherwise deliver a beam of high intensity light energy from the high intensity light energy source to a ground target region. The distance to the ground target region from the high intensity light energy source can vary depending, for example, on the type of aircraft structure being considered (and e.g., being protected via the creation of the "no-go" zone in the ground target region by the present visually detectable high intensity light images). For example, the distance from the winglet 12*a* (or from the light energy array located at or within the winglet 12*a*) to the ground target region 30 can be a distance ranging from about 8 ft. to about 12 ft. (and, in another example, about 10 ft.); while, for example, the distance from the bottom of engine assembly 14 (or from the light energy array located at or near the bottom of engine assembly 14) to the ground target region 30 can be a distance ranging from about 3 ft. to about 5 ft. (and in another example, about 4 ft.).

The light intensity of the high intensity light energy source is selected to deliver a visually detectable image at the ground target region that is visually detectable in daylight. Accordingly, as discussed herein, the light intensity of a high intensity light energy source can be greater when the distance from the light energy source to the ground target region is greater, depending on the selected effect of the visually detectable image that is provided and established at the ground target region, according to present aspects.

Returning to FIG. 4A, when the high intensity light energy source 26 within the light energy array 20 is powered "on", a high intensity light beam 26*a* is emitted from the light energy source 26 and directed to the ground target region 30, with the high intensity light beam 26*a* configured, for example, through applied and/or incorporated optical elements to focus (e.g. shape, condition, etc.,) the light beams at the ground target region and to form a ground target region visible image perimeter 32. While the ground target region visible image perimeter 32 is shown in FIG. 4A as substantially circular, present aspects contemplate the formation of a ground target region "perimeter" of any selected regular geometric shape (triangle, rectangle, octagon, polygon, etc.) or irregular shape, limited only by the optical components associated with, selected for, and/or incorporated with and into the light energy array to condition or otherwise "shape" the light beam (e.g., filters, apertures, mirrors, amplifiers, etc.).

The ground target region visible image perimeter 32 can be visually detectable (e.g., by the human eye) in daylight or at nighttime and can be formed with the understanding conveyed to, for example, ground personnel, that the area within the ground target region visible image perimeter represents a "no-go traffic zone" 34 that is not to be entered by such personnel and/or especially the vehicles operated by the ground personnel.

In one example, the no-go traffic zone 34 (and/or the ground target region 30) can be partially, entirely, or substantially entirely illuminated both at daytime (e.g., in daylight) and at nighttime (e.g., in the absence of daylight). In another example, the no-go-traffic zone 34 within the ground target region perimeter 32 may not be illuminated; with only the ground target region visible image perimeter 32 illuminated as an illuminated "border" that surrounds the no-go traffic zone 34 within the ground target region visible perimeter. As stated herein, the actual area that is selected to be illuminated will be a function of the selected optics employed within and otherwise associated with the high intensity light source within the light energy array. According to present aspects, the establishment of an enhanced safety zone that is indicated by forming the ground target region visible image perimeter is considered to be equally effective in marking a no-go traffic zone if: 1) the entirety of the no-go traffic zone is illuminated and visually detectable in part or completely; and/or 2) just the ground target region visible image perimeter is illuminated and visually detectable.

According to further present aspects, the light image on the ground target region that can visually detected in daylight as well as at nighttime can be a visually detectable light-based image that can assume a multitude of non-limiting forms and configurations including, but not limited to, color changes, solid lines and/or solid regions, broken lines (e.g., line segments), and the sequencing of pulsed light or mechanically interrupted light beams that give the visually detectable light energy the appearance of movement along and about the ground target region, including at the ground target region visible image perimeter, for example.

In addition, light filtering and screening can be implemented within or outside of the light energy array to produce moving and/or stationary images that can include advertising, announcements, including, for example the words "danger", "warning", "do not enter", etc., or sequences that repeat selected words and phrases. In addition, the selected images to be visually detectable on the ground target region can be or include, logos, scenes, etc.

FIGS. 4B and 4C are overhead plan views of the aircraft 10 on the ground that can be the aircraft shown in FIGS. 1, 2, 4A. As shown in FIG. 4B aircraft 10 comprises many of the similarly numbered elements as in FIG. 4A. In addition, in FIG. 4B, the visually detectable light imaging shown to occur at the ground target region 30 is now shown as appearing as "broken" or "discontinuous" line segments about the ground target region visible image perimeter 40 (whereas, in FIG. 4A, the visually detectable light imaging shown to occur at the ground target region 30 is shown as appearing as an "unbroken" or "continuous" line segment about the ground target region visible image perimeter 32). As shown in FIG. 4B, the area within the ground target region visible image perimeter 40 represents a "no-go" traffic zone 34 that can be concurrent in total area with the ground target region 30, with the "no-go" traffic zone 34 representing a region and/or area that is not to be entered and/or transited by ground personnel; especially vehicles operated by the ground personnel.

FIG. 4C, shows another example, with aircraft 10 comprising many of the similarly numbered elements as in FIGS. 4A and 4B. In FIG. 4C, the visually detectable light imaging shown to occur at the ground target region 30 is shown as appearing as "broken" or "discontinuous" line segments about the ground target region visible image perimeter 42. However, in FIG. 4C, additional concentric "broken" line segments are presented to the ground target region in the form of a plurality of "broken line" light image "rings" that occupy areas of the ground target region 30 within the ground target region visible image perimeter 42. The substantially concentric "broken line" ringed light images can have varying diameters to present a greater number of light images within the ground target region visible image perimeter, for example, to better illuminate, mark, and "fill" the area of the no-go traffic zone 34. As shown in FIG. 4C, the area within the ground target region visible image perimeter 42 represents a "no-go" traffic zone 34 that can be concurrent, or substantially concurrent in total area with the ground target region 30, with the no-go traffic zone 34 representing a region and/or area that is not to be entered and/or transited by ground personnel; especially the vehicles operated by the ground personnel.

While the ground target region visible image perimeters 40, 42 are shown in FIGS. 4B and 4C, respectively, as substantially circular, present aspects contemplate the formation of a ground target region "perimeter" 40, 42 of any selected regular geometric shape (triangle, rectangle, octagon, polygon, etc.) or irregular shape, limited only by the selected optical components associated with and selected for and incorporated with and into the light energy array to condition or otherwise "shape" the light beam (e.g., filters, apertures, mirrors, amplifiers, etc.).

The ground target region visible image perimeters established by the beams of high intensity light that are visually detectable by the human eye in daylight or nighttime are selected to have a visually detectable dimension on the ground such that, so long as ground vehicular traffic does not enter the perimeter of the image, no contact between ground vehicular traffic and an aircraft structure positioned above the ground markings can occur. That is, according to present aspects, the regions outside of the ground target region visible image perimeters either have no portion of aircraft above the ground marking, or the height of any aircraft structure or portion of aircraft that is positioned above and outside of the perimeter markings has a distance off the ground (e.g., a height above the ground, etc.) that safely exceeds the height of any ground vehicle, or equipment moved by ground vehicles, making any contact between ground vehicles and aircraft structures impossible.

It is understood, that by marking "no-go" traffic zones visibly on the ground, the areas outside of the no-go traffic zones are safe zones to transit (e.g., "go" zones). In this way, not only are the no-go zones apparent from the established illuminated and visually detectable marked areas, but the areas outside of the perimeter of the no-go zones can be considered a "go" zone that is safe for vehicular traffic to transit.

FIG. 5 is a side view of aircraft 10 positioned on the ground, and showing aircraft wing 12 comprising aircraft winglet 12*a*, with the underside of winglet 12*a* including light energy array 20 comprising light energy sources that include a high intensity light energy source 26 (e.g., a "second" light energy source that can be, for example, a laser, etc.) as well as a first light energy source 24 (not shown in FIG. 5) that can be, for example, a conventional wing or winglet light. While, at nighttime, a conventional light can illuminate a region of the ground beneath the winglet 12*a*, FIG. 5 can apply to an aircraft on the ground in daylight, with the high intensity light source 26 configured to illuminate, in a visually detectable fashion, the ground target region and establish, as a visually detectable image, a ground target region visible image perimeter 32 that can represent a no-go traffic zone 34 present within the ground target region visible image perimeter 32 of ground target region 30.

FIG. 5 further shows a number of aircraft elements including aircraft engine assembly 14, aircraft tail section 17, and aircraft nose 18. As shown in FIGS. 4A, 4B, 4C, each of these aircraft elements (e.g., aircraft structures, etc.) can comprise the light energy arrays 20 that are similar to the light energy array incorporated into aircraft winglet 12*a*. Although not shown in FIG. 5, the ground target regions 30 that can be illuminated to show visually detectable no-go traffic zones 34 can be configured to appear beneath selected aircraft structures where the transit of ground vehicles beneath such aircraft structures could impact the aircraft structures and damage the aircraft structures and/or the ground vehicle impacting the aircraft structure(s).

The present light energy sources can be lasers that are configured to, and are otherwise conditioned to display the desired no-go traffic zone image on the ground target region, including and especially during daylight. The intensity of the high intensity light source, (that can be, for example, high intensity light generated from lasers) have a safety rating that is rated "safe" for use around workers and that will not damage a target surface, or damage elements of the human eye as the laser light is visually detected by a human eye.

The intensity of such high intensity light sources can be selected to have the light energy sufficient to focus or otherwise produce a selected visually detectable image on the ground with the high intensity light energy source positioned at a defined distanced from the ground on an aircraft structure. That is, it is understood, according to present aspects, that, once a desired image that is to appear on the ground is selected, and the distance of the light energy source (on, for example an aircraft winglet underside) from the ground when the aircraft ground is factored in, the required light energy source intensity can be calculated. It is further understood that the various aircraft components that are protected by establishing a no-go traffic zone beneath such aircraft components can each have varying distances from the ground that may require different energy sources of differing intensities used at various location on the aircraft; or that the light energy sources can have variable intensity output capabilities that are selected based on the distance of the light energy source from the ground target region, and the selected light effect for a ground target region.

The light energy sources that can be suitable for use in the present apparatuses and systems can be light energy sources said to be high-intensity light energy sources that can be placed into high-intensity light energy arrays that have safety ratings, in the case of lasers, of, for example, "3R". In addition, the present high-intensity light energy sources and high-intensity light energy arrays include light energy delivered from a light energy source (that can include, for example, a laser, a focused LED array, etc.), at an intensity measured at the ground target region ranging from about 20,000 lux to about 30,000 lux at a distance between the ground target region and the light energy source ranging from about 5 feet to about 20 feet.

According to further present aspects, the present light energy arrays (e.g., comprising the high intensity light energy sources, etc.) can be mounted on an aircraft structure to be protected that is located directly "over" or substantially over a "no-go zone" by beaming light energy substantially downward from a mounted location on an aircraft structure location that is located above or "over" a "no-go" traffic zone. In addition, in another present example, a light energy source can be located at an aircraft structure location that is not directly above, or substantially above or over a no-go traffic zone, but the light energy beam can be directed (to a selected ground target region to illuminate or otherwise "marks" a no go traffic zone within the ground target region), for example, from a light energy source at a position on an aircraft fuselage, with the light directed to mark or otherwise denote a ground target region under a winglet, under an engine, under a tail section, under a nose, etc.

In other words, light energy can be directed to protect an aircraft structure at one location (e.g., a winglet, a wing, an engine, a tail section, a nose, etc.) by beaming light energy substantially downward from a proximate aircraft structure that may not originate from the winglet, from the wing, from the engine, from the tail section, from the nose, etc., but the resulting ground region image protects a desired aircraft structure that is located above an illuminated ground target region, and forms a visually detectable "no-go" zone at the ground target region.

FIG. 5 further shows distances of various aircraft structures from the ground. For example, FIG. 5 shows distance "D1" extending from aircraft winglet to the ground; distance "D2" extending from aircraft engine assembly (bottom of the aircraft engine assembly, for example) 14 to the ground; distance "D3" extending from tail section 17 to the ground; and distance "D4" extending from aircraft nose to the ground. For example, depending on the aircraft model, "D1" can be a distance ranging from about 8 ft to about 12 ft. "D2" can be a distance ranging from about 3 ft to about 5 ft. "D3" and "D4" can be a distance ranging from about 15 feet to about 20 feet.

Architecture used to house the high intensity light source in the present light energy arrays can be dedicated to the high intensity light source. In addition, for example, in the case of at least aircraft winglets, lighting architecture used to house and power conventional lights located at the winglet can be modified to accommodate both conventional lighting and the present high intensity light sources (e.g., lasers, etc.), so that no additional or very little additional weight is added to the aircraft when it is fitted to incorporate the presently disclosed light energy arrays. In addition, if desired, the present light energy arrays can be configured to replace conventional lighting and realize a weight savings through the incorporation of the present light energy arrays.

Further present aspects are directed to a system for demarking "safe" ground transit areas from "unsafe" ground transit areas around and beneath aircraft on the ground where the present systems comprising the present light energy array and comprising a high intensity light energy source are configured to provide an illuminated ground marking that is visually detectable even in daylight with the resulting ground image selected to change appearance, flash, change color, or otherwise change in shape, including giving the appearance of motion. Present systems can further include power sources and optics selected to yield a selected visual image on the ground, and present systems further include sequencers (e.g., signal sequencers, light sequencers, etc.), controllers, software, hardware, etc., in communication with the light energy arrays. Present aspects further include sensors and controllers in communication with present systems that can automatically activate and otherwise trigger the operation of the light energy arrays when: 1) an aircraft is "sensed" or confirmed to be in contact with the ground; 2) when an aircraft is determined and/or confirmed in a selected phase of flight such as, for example, landing, taxiing, and the ground movement that attends an aircraft arriving at a stationary location and where ground vehicles may be, or may soon be in proximity of the aircraft. Further present aspects, contemplate the "no-go" traffic zones able to "move" or "shift" as the aircraft moves and provide a "mobile warning" to ground vehicles, as the ground target region continues to "move" or "shift" due to the movement of the aircraft.

FIG. 6 is a diagram outlining a system according to present aspects. System 50, as shown in FIG. 6, includes a power source 28 that can be a dedicated power source or that can be an existing power source provided on an aircraft. Power source 28 is in communication with a light energy array 20 that can include a high intensity light energy source 26 that can be, for example, a laser. Light energy array 20, as shown in system 50, is further in communication with a controller 46. Controller 46 can be in communication with power source 28 and controller 46 can further be in communication with a sequencer 44 (e.g., a signal sequencer, light sequencer, etc.) that can be a separate component or (not shown in FIG. 6) that can be incorporated into controller 46 or that can be incorporated into light energy array 20. System 50 further includes sensor 48 that is shown in communication with power source 28 and that is further in communication with controller 46.

According to present aspects, in operation, system 50 can control the activation of light energy array such that sensor 48 can determine an aircraft phase of flight that and/or that can detect when the aircraft is or is about to be in contact with the ground upon landing or near-landing, etc. Sensor 48 can send a signal to at least one of power source 28 and controller 46 to activate light energy array 20 to deliver a high intensity light energy beam from the high intensity light energy source to a ground target region and form a visually detectable illuminated image, including during daytime (e.g., in daylight) and form a ground target region visual image perimeter representing a no-go traffic zone. The high intensity light energy source can be in communication, as shown in FIG. 6 with a sequencer 44 that can be a signal generating sequencer for the purpose of conditioning the light energy beam and otherwise changing or altering the visually detectable light image in the ground target region in terms of light pattern, light color, light images appearing to have movement and/or motion, etc.

FIGS. 7, 8, 9, and 10 are flowcharts outlining methods according to further present aspects. FIG. 7 illustrates a method 100, according to present aspects, for visually designating safe and unsafe ground areas proximate to an aircraft on the ground, with method 100 including directing 102 light energy from a light energy source onto a ground target region. In one example, the light energy source can be located within a light energy array that is positioned on the underside of an aircraft, underside of an aircraft assembly, underside of an aircraft sub-assembly, etc., with the light energy directed from the light energy source to a ground target region located beneath an aircraft structure. Method 100 further includes forming 104 visually detectable ground target region visible image perimeter that is configured to be visually detectable in daylight; and indicating 106 a no-go traffic zone within the ground target region visible image perimeter.

FIG. 8 is a flowchart outlining another method 200 for visually designating safe and unsafe ground areas proximate to an aircraft on the ground according to present aspects, with method 200 including directing 102 light energy from a light energy source onto a ground target region, and forming 104 visually detectable ground target region visible image perimeter that is configured to be visually detectable in daylight. Method 200 further includes altering 202 the appearance of visually detectable ground target region visible image perimeter, according to present aspects, and indicating 106 a no-go traffic zone within the ground target region visible image perimeter.

FIG. 9 is a flowchart outlining another method 300 for visually designating safe and unsafe ground areas proximate to an aircraft on the ground according to present aspects, with method 300 including determining 302 an aircraft position and/or phase of flight and/or contact with the ground, and activating a high intensity light energy source within a light energy array. Method 300 further includes directing 102 light energy from a light energy source onto a ground target region. In one example, the light energy source can be located within a light energy array that is positioned on the underside of an aircraft, underside of an aircraft assembly, underside of an aircraft sub-assembly, etc., with the light energy directed from the light energy source to a ground target region located beneath an aircraft structure. Method 100 further includes forming 104 visually detectable ground target region visible image perimeter that is configured to be visually detectable in daylight; and indicating 106 a no-go traffic zone within the ground target region visible image perimeter.

FIG. 10 is a flowchart outlining another method 400 for visually designating safe and unsafe ground areas proximate to an aircraft on the ground according to present aspects, with method 400 including directing 402 light energy from a light energy source on an aircraft onto a ground target region while the aircraft is in motion to form a moving or changing ground target region, forming 404 a moving ground target region visible image perimeter, and indicating 406 a no-go traffic zone within the moving ground target region visible image perimeter.

The methods outlined in FIGS. 7, 8, 9, and 10 can employ the apparatuses and systems shown in FIGS. 1, 2, 3, 4A, 4B, 4C, 5, and 6, and described herein.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An apparatus for establishing a visible no-go traffic zone beneath an aircraft structure of an aircraft on the ground, said apparatus comprising:

a light energy array positioned beneath the aircraft structure, said at least one light energy array comprising a first light energy source configured to deliver light energy having a lower intensity that is visible to a human eye at nighttime, and a second light energy source that is separate from the first light energy source and that is configured to deliver light energy with a higher intensity than the first light energy source to be visible to the human eye at both the nighttime and in daytime, said light energy array configured to direct the light energy from the light energy array downward toward the ground onto a ground target region located beneath the aircraft structure to form a ground target region visible image perimeter, said ground target region visible image perimeter located a selected distance from the light energy array, said light energy array configured to provide the ground target region visible image perimeter to be visible during the daytime and the nighttime;

the light energy array configured to deliver a plurality of concentric rings that are visible within the ground target region visible image perimeter and with the concentric rings centered around a center point of the ground target region visible image perimeter and having a common shape as the ground target region visible image perimeter;

a housing, said housing located in the underside of the aircraft structure, said housing configured to retain the first light energy source and the second light energy source in a selected position on the underside of the aircraft structure of an aircraft, said housing further configured to direct the light energy from said at least one of the first light energy source and the second light energy source downward to illuminate the ground target region;

a power source in communication with the first light energy source and the second light energy source; and wherein said aircraft structure comprises at least one of an aircraft wing assembly, an aircraft winglet, an aircraft nose, an aircraft tail section, and an aircraft engine assembly.

2. The apparatus of claim 1, wherein the power source is positioned aboard the aircraft.

3. The apparatus of claim 1, wherein the light energy array is positioned on the aircraft structure, with said light energy array positioned a distance from the ground target region ranging from 5 feet to 20 feet.

4. The apparatus of claim 1, wherein the light energy array comprises at least one of a laser and a focused LED array.

5. The apparatus of claim 1, wherein the ground target region visible image perimeter is configured to move relative to the ground based on a changing location of the aircraft.

6. The apparatus of claim 1, wherein the ground target region visible image perimeter is a continuous ground target region visible image perimeter.

7. The apparatus of claim 1, wherein the ground target region visible image perimeter is a discontinuous ground target region visible image perimeter.

8. The apparatus of claim 1, wherein the ground target region visible image perimeter is configured to change color from at least a first color to a second color.

9. The apparatus of claim 1, wherein the ground target region visible image perimeter is configured to produce an appearance of movement.

10. An aircraft structure comprising the apparatus of claim 1.

11. An aircraft comprising the apparatus of claim 1.

12. A method for establishing the visible no-go traffic zone beneath the aircraft structure, the method comprising:

using the apparatus of claim 1 and visually designating unsafe ground area beneath the aircraft by:

directing the light energy from the first light energy source onto the ground area during nighttime;

forming a first ground target region visible image perimeter with the first light energy source at the ground area;

directing the light energy from the second light energy source onto the ground area during daylight; and forming a second ground target region visible image perimeter with the second light energy source at the ground area beneath the aircraft structure that is visible to a human eye in daylight.

13. The method of claim 12, further comprising:

altering an appearance of the first ground target region visible image perimeter beneath the aircraft structure.

14. The method of claim 12, further comprising:

determining that the aircraft is in contact with the ground;

activating the first light energy source and the second light energy source while the aircraft is on the ground; and forming a moving ground target region visible image perimeter beneath the aircraft structure when the aircraft is in motion while at a location in contact with the ground.

15. The apparatus of claim 1, wherein the target region visible image perimeter comprises a circular shape that is centered around the light energy array.

16. A system for designating unsafe ground areas beneath an aircraft, said system comprising:

a light energy array positioned beneath the aircraft structure, said at least one light energy array comprising a first light energy source that delivers a first beam of light energy that is visible during a low environmental light situation and a second light energy source that delivers a second beam of light energy that is more intense that is visible during a high environmental light situation, said light energy array configured to direct light energy from the light energy array downward toward the ground onto a ground target region located beneath the aircraft structure to form a ground target region visible image perimeter, said ground target region visible image perimeter visible to a human eye in daylight and said ground target region visible image perimeter further visible to the human eye at nighttime;

a housing, said housing located in the underside of the aircraft structure, said housing configured to retain the first light energy source and the second light energy source in a selected position on the underside of the aircraft structure of an aircraft;

a power source, said power source in communication with the first light energy source and the second light energy source;

a controller, said controller in communication with at least one of the power source, the first light energy source, and the second light energy source;

a sequencer, said sequencer in communication with at least one of the controller, the power source, and the second light energy source; and wherein the ground target region visible image perimeter comprises a circle that is centered around the light energy array.

17. The system of claim 16, further comprising a sensor, said sensor in communication with at least one of the power source and the controller, said sensor configured to confirm an aircraft location as being in contact with a location on the ground.

18. The system of claim 16, wherein the ground target region visible image perimeter identifies a no-go traffic zone beneath the aircraft structure and within the ground target region visible image perimeter beneath the aircraft structure.

19. The system of claim 16, wherein the light energy array is at least one of a laser and a focused LED array.

20. An aircraft comprising the system of claim 16.

* * * * *